UNITED STATES PATENT OFFICE.

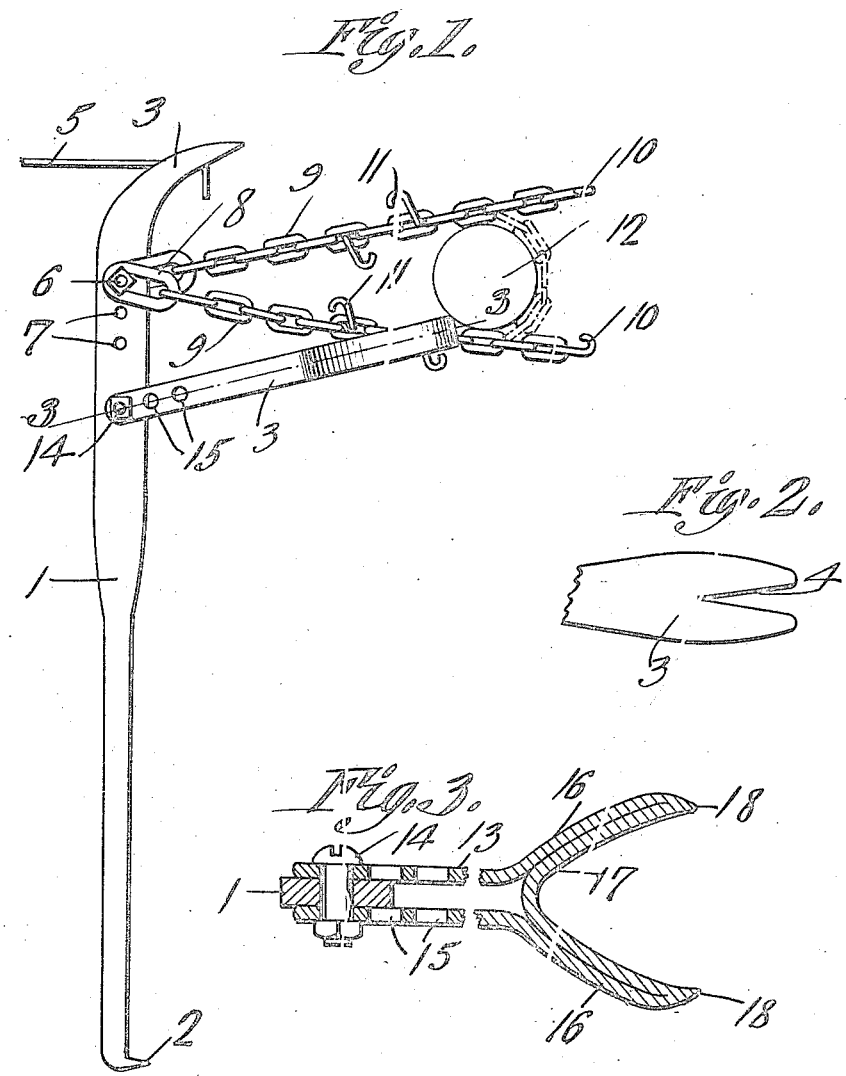

JOHN T. H. DRAKE, OF ALTAMONT, MISSOURI.

WIRE-STRETCHER.

1,248,289.  Specification of Letters Patent.  Patented Nov. 27, 1917.

Application filed June 4, 1917. Serial No. 172,705.

*To all whom it may concern:*

Be it known that I, JOHN T. H. DRAKE, a citizen of the United States, residing at Altamont, in the county of Davies and State of Missouri, have invented a new and useful Wire-Stretcher, of which the following is a specification.

The present invention appertains to wire stretchers, and aims to provide a novel and improved implement of that character which is simple and inexpensive in construction, as well as thoroughly practical and efficient in use, the stretcher having improved features of construction to enhance the utility thereof.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein:—

Figure 1 is a plan view of the wire stretcher as in use.

Fig. 2 is an elevation of the wire-holding claw.

Fig. 3 is a view illustrating the post-engaging dog or arm, the same being a section on the line 3—3 of Fig. 1.

The device embodies a lever or bar 1 of suitable proportions, and provided at one end with a spur 2 extending at an angle, for use in extracting staples from the fence posts. The lever is provided at its outer end with a portion 3 curved toward one side and bifurcated, the V-shaped slot thereof being adapted to grip the wire to be stretched.

The lever 1 is provided therein near the portion 3 with longitudinal series of apertures 7 for the adjustable reception of a bolt 6 or equivalent attaching element, said bolt providing a fulcrum for the lever, which can be adjusted, to vary the leverage or purchase obtained, by changing the length of the arms of the lever. Links 8 are engaged with the bolt or fulcrum 6, and have connected thereto, a pair of chains 9. The links at the free ends of the chains have hooks 10, and other links of said chains have loose hooks 11 thereon, whereby when the chains are extended across opposite sides of a fence post 12 or other anchor member, the free terminals of the chains can be wrapped around the post, and the chains attached together by the hooks, whereby to anchor the device to the post. When the device is thus anchored, the long arm of the lever 1 can be swung away from the post, to move the short arm or portion toward the post, thereby stretching the wire 5.

In order to hold the lever in position, after the wire has been stretched, so that the wire can be fastened to the post or posts past which it is drawn, a dog or arm 13 is pivoted, as at 14, by means of a bolt or other pivot element, to the lever 1. This dog 13 is formed of a bar or strip of metal, doubled longitudinally upon itself, with its terminals overlapping the opposite sides of the long arm of the lever 1, and engaging the pivot 14, the terminals of said bar having a series of apertures 15 for the reception of the bolt 14, to adjust the dog, for properly engaging the post. The intermediate portion of the bar is bent to provide diverging portions 16, and a reëntrant V-shaped portion 17 fitting within the portions 16, said portions providing a fork to move astride the respective chain 9. The fork has its ends sharpened, as at 18, to bite the post when the dog is swung thereagainst, as seen in Fig. 1, whereby the dog serves as a prop between the long arm of the lever and the post, thus holding the lever in position with the wire stretched.

Having thus described the invention, what is claimed as new is:—

1. A wire stretcher embodying a lever having a fulcrum near one end providing short and long arms, the short arm having means for the connection of a wire thereto, means connected to the fulcrum and adapted to be attached to a post or other anchor, and a dog pivoted to the long arm and having a fork at its free end to straddle said means and engage the post at opposite sides of said means when the long arm is swung away therefrom.

2. A wire stretcher embodying a lever having a fulcrum near one end providing long and short arms, the short arm having means for the connection of a wire therewith, attaching means connected to the fulcrum and applicable to a post or other anchor, and a dog embodying a strap doubled longitudinally upon itself and having its terminals pivoted to the long arm, the intermediate portion of the strap having diverging portions and a reëntrant portion fitting therebetween providing a fork to move astride the attaching means and engage the post when the long arm is moved away therefrom.

In testimony that I claim the foregoing as my own, I have hereto affixed my signature in the presence of two witnesses.

JOHN T. H. DRAKE.

Witnesses:
SIMON GROVE,
E. G. URBAN.